Patented Aug. 10, 1926.

1,595,377

UNITED STATES PATENT OFFICE.

WILLIAM H. BOYNTON, OF BERKELEY, CALIFORNIA.

VACCINE FOR PREVENTION OF RINDERPEST AND HOG CHOLERA.

No Drawing. Application filed June 30, 1924. Serial No. 723,117.

This invention relates to vaccines for prevention of rinderpest and hog cholera.

The object of the invention is to produce a vaccine to be administered by subcutaneous injection, to animals exposed to rinderpest or cholera, and which vaccine will act as a prophylactic for the particular disease for which it was prepared. While the anti-rinderpest vaccine and the anti-cholera vaccine are produced in the same manner, they differ in that the substance for the anti-rinderpest vaccine is obtained from an animal infected with that disease, and the substance for the anti-cholera vaccine is obtained from a cholera-infected animal.

In the production of these vaccines, a highly susceptible animal is given rinderpest or cholera by infecting it with virulent blood taken from an animal sick with that disease. Close watch is kept on the infected animal, and its temperature taken frequently. The infected animal should show a rise of temperature within a few days, and on the third or fourth day after the initial rise of temperature the animal should show signs of inappetance, and diarrhœa should develop. As soon as diarrhœa sets in the animal is killed, and all of the lymphatic glands, including the spleen and the liver, are removed in as aseptic a manner as possible. These tissues are used in making the vaccine, in the following manner:

All of the fat, heavy connective tissue and fascia are first removed from these organs. The latter are then washed in clean water and placed in a vessel containing a five (5%) per cent phenol solution, where they are allowed to remain for ten minutes, during which time they are stirred or agitated to insure that the phenol solution reaches all surfaces. This step is taken to destroy any contaminating organisms with which they may have come in contact while being removed from the animal or during subsequent handling. Thereafter the organs are washed in a sterilized water to remove any excess of phenol solution.

The organs are now cut into small pieces, it being important to keep the cutting-block or table on which this work is done well disinfected. The small pieces of tissue are next passed through a meat-grinder, the meat-grinder and other utensils being thoroughly sterilized before using. The ground-up mixture of liver, spleen and lymphatic glands is next passed through a tissue-mill which both cuts and macerates the tissue, thereby breaking the tissue up into minute particles. It is recommended that the tissue be passed through the mill three or four times, to insure thorough cutting and maceration. Before or during the last step I add to the tissue a small quantity of virulent blood taken from the sick animal from which the organs are removed.

When the tissue containing the blood is thoroughly ground, it is passed through a strainer of about a $\frac{1}{12}$th-inch mesh, being forced therethrough by means of a small mortar-pestle. By this means the parenchymatous tissue passes through the strainer leaving the connective tissue. This residue or connective tissue is discarded, and only that part which passes through the strainer is used for making the vaccine.

To the strained tissue is added one-third its weight in grammes of sterilized glycerine which has been titrated to the $P_H$ hydrogen-ion concentration of 7.6 to 7.8 or just a fraction over the alkalinity of normal blood. In other words, to 900 grammes of tissue mixture there will be added 300 cubic centimetres of sterilized titrated glycerine. To this mixture I add one-half (½%) per cent phenol, which in the example above mentioned would amount to about six cubic centimetres of pure phenol. It is preferable, however, to mix the phenol and the glycerine together and then add such mixture to the tissue. This mixture of tissue, glycerine, and phenol is thoroughly agitated in a sterilized vessel for several minutes, to insure thorough commingling.

This final mixture is now placed in small glass bottles which have been previously sterilized. The bottles should be filled to within about one centimetre of their tops, care being used to see that none of the mixture splashes on the inside of the neck of the bottle or on the space not filled. The bottle containing the mixture are now placed in an electrically-heated water-bath in upright position. The water in the bath should come up well over the level of the mixture within the bottle. This water-bath is then heated gradually to a temperature of from 42 to 42½ degrees centigrade, and held there for about three hours. Thereafter the bottles are taken out and the contents emptied into a large sterilized container, where the material is again thoroughly mixed by agitation, to insure uniformity and to have every part of the mixture as nearly as possible of the same potency. This mixture constitutes the rinderpest or hog-cholera vaccine in a concentrated form. It should be kept in tightly-stopped sterilized containers, in a refrigerator or ice-box until used.

Each batch of vaccine should be tested on a highly susceptible animal before being used in the field. The test-animal is given a subcutaneous injection of from one and one-half to two cubic centimetres of the concentrated vaccine suspended in a diluting fluid sufficient to make twenty cubic centimetres. This diluting fluid preferably consists of two parts sodium chloride solution and one part glycerine, titrated to 7.8 hydrogen-ion concentration and thoroughly sterilized. A twenty cubic centimetre injection is given to insure good spread of the diluted vaccine under the animal's skin, thereby facilitating absorption. The injections are made with a syringe having a large-bore needle to facilitate the passage of the suspended minute particles of tissue which the vaccine contains. The site of the injection is on either side of the animal, preferably over the ribs. The point of injection is washed with a disinfectant before inserting the needle.

In about seven days after the first vaccination the animal is given a second vaccination, at which time the dose of concentrated vaccine is increased by one or two cubic centimetres. This second injection should be given on the opposite side of the animal to the first injection. About seven days after the second vaccination the test-animal should be exposed to the particular disease for which it is being vaccinated, that is, rinderpest or hog-cholera, by placing it in the presence of an animal sick with that disease, and also by giving it a subcutaneous injection of from five to six centimetres of virulent blood taken from the sick animal. If the test-animal passes through this exposure without showing signs of infection, then this particular batch of vaccine can be approved for use in the field. The ordinary dose of vaccine for field use is from two and one-half to three cubic centimetres of concentrated vaccine diluted up to twenty cubic centimetres with diluting fluid. For animals in the field, three vaccinations should be given, seven days apart. The reaction is not severe, and in case of work-animals they may continue their work every day during this period without injury to them or to the development of immunity against the disease.

Slight variations in the strength of the vaccine can be produced by heating the vaccine to about 41½ to 43½ degrees centigrade for three hours. As a rule, when the vaccine is treated in this manner it is not sufficiently attenuated, and is liable to give the animal a more or less severe reaction. Age, however, will gradually attenuate it, and if kept for three or four months it may be safely used. In any case, the vaccine loses its potency with age, and vaccine which is potent in two cubic centimetre doses at two months of age should be administered in five cubic centimetre doses at four months of age.

This vaccine of course has no curative effect upon an animal sick with rinderpest, or one in the incubation period of that disease. It is simply a prophylactic treatment. The length of immunity developed by the vaccine varies in different animals. Field observations, however, show that immunity extends over a period of from two to three years. It is recommended that full-grown animals be revaccinated every two years, and young animals once each year for two years and then every two years thereafter.

In administering the cholera vaccine to hogs, it is preferable to inject the vaccine in the groin or arm pit. It may also be administered "per orum".

What I claim and desire to secure by Letters Patent is:

1. A vaccine for the prevention of rinderpest and hog cholera, consisting of the ground-up viscera and lymphatics and a small quantity of virulent blood taken from an animal infected with a like disease, added to which is a glycerine titrated to a hydrogen ion concentration slightly above the alkalinity of normal blood, and a suitable antiseptic.

2. The preparation of a vaccine for the prevention of rinderpest and hog cholera which consists of grinding or macerating the viscera and lymphatics taken from an animal infected with a like disease, adding thereto a small quantity of virulent blood taken from a similarly-infected animal, mixing therewith glycerine titrated to a hydrogen ion concentration slightly above the alkalinity of normal blood, and attenuating the same by heating to approximately 42 degrees centigrade for several hours.

WILLIAM H. BOYNTON.